Jan. 20, 1931.  F. H. ROSENCRANTS  1,789,692
DEVICE FOR FEEDING PULVERIZED FUEL TO FURNACES
Filed Nov. 27, 1925
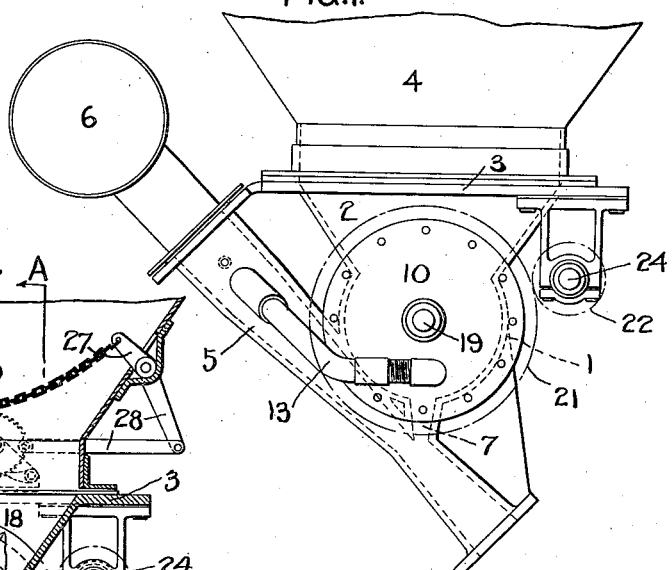
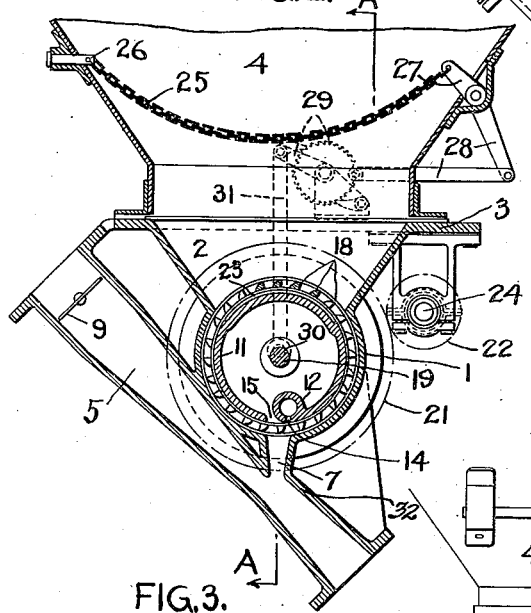
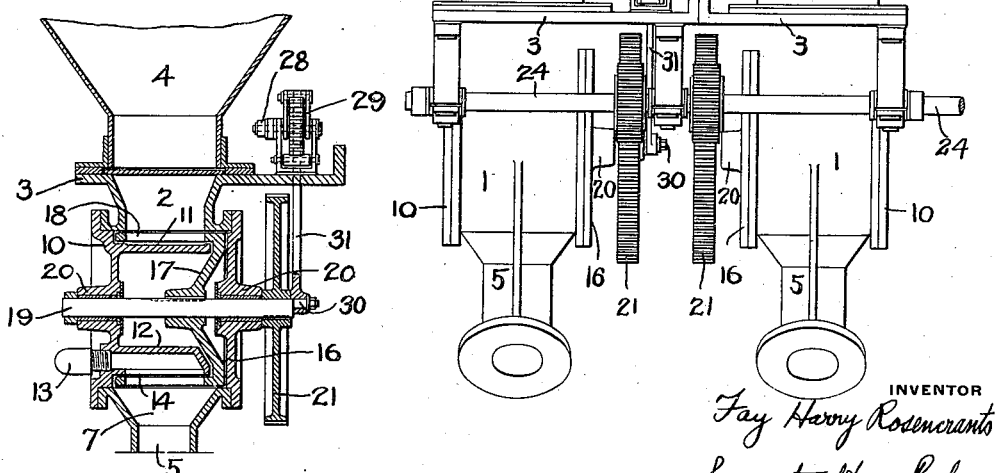
INVENTOR
Fay Harry Rosencrants
Synnestvedt & Lechner
ATTORNEYS Patented Jan. 20, 1931

1,789,692

UNITED STATES PATENT OFFICE

FAY HARRY ROSENCRANTS, OF KINGSWAY, LONDON, ENGLAND, ASSIGNOR TO INTERNATIONAL COMBUSTION ENGINEERING CORPORATION, OF NEW YORK, N. Y., A CORPORATION OF NEW YORK

DEVICE FOR FEEDING PULVERIZED FUEL TO FURNACES

Application filed November 27, 1925, Serial No. 71,608, and in Great Britain January 7, 1925.

The object of this invention is to provide a feeding device of simple but robust construction adapted to effect in a positive and efficient manner the regular feeding of a predetermined supply of pulverized fuel to the burners of pulverized fuel burning furnaces. As compared with existing types of pulverized fuel feeders the improved feeder is more positive in action and less costly to construct.

Fig. 1 of the accompanying illustrative drawings shows in side elevation a construction of pulverized fuel feeder embodying the invention.

Fig. 2 shows the feeder in central vertical section.

Fig. 3 is a vertical section corresponding to the line A A of Fig. 2, and,

Fig. 4 is an elevation illustrating two of the improved feeders arranged side by side.

The main casing of the feeding device illustrated consists of a cylinder 1, flanged at each end, and formed with an outwardly flared inlet branch 2 projecting from the upper part of its cylindrical wall, the top of said inlet branch having a flange 3 suitable for bolting to the lower end of a pulverized fuel bin 4. Cast in one with the casing 1 at one side thereof is a feed conduit 5 which is of the Venturi type and which extends tangentially to the casing 1, the upper end of said feed conduit being flanged for connection to a main air duct 6 and the lower end of said conduit being flanged for connection to a feed pipe leading to a pulverized fuel burner located in the combustion chamber of the furnace to which the device is applied. The bore of this feed conduit 5 decreases in cross section inwardly from each end, the decrease being somewhat irregular or eccentric at the lower end as indicated at 32 in Figure 2 and at the point of smallest cross section a vertical opening constituting a feed chute 7 connects the feed tube 5 to a discharge opening in the lower part of the wall of the cylindrical casing 1. Near its upper end the feed conduit 5 is fitted with a butterfly valve 9 to control the supply of air thereto. One end of the cylindrical casing 1 is closed by an end plate 10 formed in one with a cylindrical body or shell 11 that projects concentrically within the fixed casing 1 and cast in one with the body or shell 11 is an air channel or conduit 12 connected to the feed conduit 5 adjacent to the valve 9 controlling the air supply thereto, by a pipe connection 13. The air channel or conduit 12 is formed with a slot 14 in its lower wall located over the feed chute 7 and, adjacent to the said air channel or conduit 12 a slot 15 is formed in the wall of the cylindrical body or shell 11.

The other end of the fixed cylindrical casing is closed by an end plate 16 between which and the adjacent end of the cylindrical body or shell 11 is a star wheel or rotor disc 17 which carries a ring of blades or vanes 18 that work in the annular chamber formed by and between the cylindrical body or shell 11 and the fixed casing 1. The rotor disc 17 is formed with a boss that is keyed to a shaft 19 extending through the fixed casing 1 and rotating in bearings 20 formed therefor in the two end plates 10 and 16, one end of the shaft 19 being fitted with a toothed wheel 21 into which gears a pinion 22 of the driving mechanism. The blades or vanes 18, of which there may be twenty-four or any other desired number, receive between them pulverized fuel from the bin 4 as they travel past the inlet branch 2 of the casing 1 and convey the said fuel to the discharge chute 7 down which its fall is facilitated by the blast of air from the slot 14 of the air channel or conduit 12.

With advantage the wall of the cylindrical body or shell 11 may, as shown, be formed with a depression 23 at its upper part directly under the inlet branch of the casing 1 so that a full complement of powdered fuel falls between and is fed forward by the blades or vanes 18.

In order to facilitate the fall of pulverized fuel from the supply bin 4 any appropriate means may be provided to disturb intermittently the fuel in the lower part of the said bin. In the example illustrated there is employed for this purpose a chain 25 that extends across the bin. One end of this chain is anchored at 26 and the other end is connected to a lever 27 that, through suitable lever and link mechanism 28 and ratchet and pawl mechanism 29, is rocked to and fro in order to move the chain 25 in the powdered fuel upon rotation of the shaft 19, a crank pin 30 projecting from the end of said shaft engaging the lower end of an operating link 31. This mechanism however does not, per se, form any part of the present invention.

For the purpose of ensuring that the butterfly valve or air damper 9 is opened when the feeder is set in operation any suitable means, for example a magnetic clutch or other device, may be provided in operative connection with the driving shaft 24 or other moving member of the feeding apparatus.

It will be understood that in details of construction variations may be made without departure from the invention and that any desired number of feed devices, corresponding to the number of burners to be fed with pulverized fuel, may be placed in a row, the several rotors being driven through appropriate gearing from a common countershaft. Fig. 4 for example shows in elevation two feed devices arranged side by side and driven from a common counter shaft 24.

What I claim is:—

1. Pulverized fuel feeding apparatus comprising a casing having an inlet and an outlet opening, a star wheel in said casing, a fixed member within the ring of blades of said star wheel forming a cylindrical chamber therein and having an air inlet in its end and an air outlet adjacent the casing outlet, and a Venturi type feed conduit, said casing outlet communicating with said conduit at a point adjacent its restriction.

2. Pulverized fuel feeding apparatus comprising a cylindrical casing having a fuel inlet and a fuel outlet; a star wheel in said casing; a fixed member within the ring of blades of said star wheel forming a cylindrical chamber therein and forming with the walls of said cylindrical casing an annular chamber in which said blades travel, said member having an air inlet in its end and a slot-like air outlet adjacent the casing outlet; and a Venturi type burner feed conduit, said casing outlet communicating with said conduit at a point just beyond its restriction in the direction of travel of air through said conduit.

3. Pulverized fuel feeding apparatus comprising a casing having an inlet and an outlet, a star wheel in said casing, a fixed member within the ring of blades of said star wheel forming a cylindrical chamber therein and having an air inlet in its end and an air outlet adjacent the casing outlet, and a Venturi type feed conduit, said casing outlet being inclined to the feed conduit and communicating therewith at a point adjacent its restriction.

4. Pulverized fuel feeding apparatus comprising a cylindrical casing having a fuel inlet and a fuel outlet; a star wheel in said casing; a fixed member within the ring of blades of said star wheel forming a cylindrical chamber therein and forming with the walls of said cylindrical casing an annular chamber in which said blades travel, said member having an air inlet in its end and a slot-like air outlet adjacent the casing outlet; and a Venturi type burner feed conduit, said casing outlet being inclined to the feed conduit and communicating therewith at a point just beyond its restriction in the direction of travel of air through said conduit.

5. In apparatus of the character described, a substantially Venturi shaped burner feed conduit and an inclined fuel inlet opening at a point adjacent the restriction adapted to deliver fuel to the conduit, said conduit being eccentrically enlarged adjacent the fuel inlet and away from the restriction.

6. In apparatus of the character described, a substantially Venturi shaped burner feed conduit eccentrically enlarged beyond its restriction in respect to the direction of flow in the conduit and having an inclined fuel inlet opening at the meeting point of the enlarged section and the restriction adapted to deliver fuel to the conduit in the direction of flow therethrough.

7. Pulverized fuel feeding apparatus comprising a Venturi type feed conduit, a casing having an inlet and an outlet, a star wheel in said casing having blades forming buckets for the fuel, a fixed member within the ring of blades of said star wheel forming a cylindrical chamber therein and having an air inlet in its end and an air outlet adjacent the casing outlet which air outlet is adapted to direct an air blast into the buckets of the star wheel at said point to blow the fuel therein to the casing outlet which communicates with said Venturi type feed conduit at a point adjacent its restriction.

8. Pulverized fuel feeding apparatus comprising a cylindrical casing, a fuel inlet and a fuel outlet, a star wheel in said casing having blades forming fuel buckets, a fixed member within the ring of blades of said star wheel forming a cylindrical casing and an annular chamber in which said blades travel, said member having an air inlet in its end and a slot-like air outlet adjacent the casing outlet adapted to direct an air blast into the star wheel buckets at this point, and a Venturi type burner feed conduit, said casing outlet communicating with said conduit at a point just beyond its restriction in the direction of flow therethrough.

In testimony whereof, I have signed my name to this specification.

FAY HARRY ROSENCRANTS.